United States Patent
Suzuki

[19]

[11] Patent Number: 6,029,093
[45] Date of Patent: Feb. 22, 2000

[54] CONTROL SYSTEM FOR PROCESSING MACHINERY INCLUDING A BUS CONVERTER FOR INTERFACING A CONTROLLER AND A SEQUENCER HAVING DIFFERENT BUS SPECIFICATIONS

[75] Inventor: Kimio Suzuki, Numazu, Japan

[73] Assignee: Toshiba Kikai Kabushiki Kaisha, Tokyo, Japan

[21] Appl. No.: 08/895,240

[22] Filed: Jul. 16, 1997

[30] Foreign Application Priority Data

Jul. 16, 1996 [JP] Japan .................................. 8-186061

[51] Int. Cl.[7] .................................................. G05B 11/01
[52] U.S. Cl. .................................. 700/11; 700/3; 700/19; 700/20; 710/105; 710/107; 713/400
[58] Field of Search ...................... 364/146, 136, 364/140.01, 140.02, 140.06; 395/800, 132–136; 363/184, 188, 189; 700/2, 3, 4, 5, 11, 25, 19, 20; 710/100, 105, 101, 107; 713/400

[56] References Cited

U.S. PATENT DOCUMENTS

| | | | |
|---|---|---|---|
| 4,674,053 | 6/1987 | Bannai et al. ........................... | 364/476 |
| 4,882,670 | 11/1989 | Isobe et al. .............................. | 364/188 |
| 5,062,052 | 10/1991 | Sparer et al. ............................ | 364/473 |
| 5,195,029 | 3/1993 | Murai et al. ............................. | 364/184 |
| 5,229,931 | 7/1993 | Takeshima et al. ..................... | 364/133 |
| 5,325,287 | 6/1994 | Spahr et al. ............................. | 364/146 |
| 5,539,650 | 7/1996 | Hehl .................................... | 364/476.05 |
| 5,553,297 | 9/1996 | Yonezawa et al. ...................... | 395/800 |
| 5,792,483 | 8/1998 | Siegrist et al. .......................... | 425/135 |

*Primary Examiner*—Paul P. Gordon
*Assistant Examiner*—Ramesh Patel
*Attorney, Agent, or Firm*—Fish & Richardson, P.C.

[57] ABSTRACT

A control system for processing machinery has at least one sequencer for processing machines to each of which at least one processing machine is connected, a controller for controlling the sequencer and a bus converter for converting signals flowing in a bus in the case where a first bus of the sequencer and a second bus of the controller are made on the basis of different specifications. In this system, even if manufactures of the controller and the sequencer are different each other, an appropriate signal conversion is performed based on difference of specifications of both buses, and therefore secure connection adapted to real time control can be obtained.

9 Claims, 4 Drawing Sheets

CONTROL SYSTEM FOR PROCESSING MACHINERY INCLUDING A BUS CONVERTER FOR INTERFACING A CONTROLLER AND A SEQUENCER HAVING DIFFERENT BUS SPECIFICATIONS

BACKGROUND OF THE INVENTION

1. Field of the Invention

This invention relates to a control system for processing machinery, and particularly to a control system which can control a diecast machine, etc. even in a case where the controller of the diecast machine and a sequencer have been manufactured by different manufacturers.

2. Description of the Background Art

When a plurality of diecast machines are to be controlled, the control is performed by connecting a sequencer to a diecast controller, and by connecting the plurality of diecast machines to the sequencer. In this case, a manufacturer of the sequencer is not necessarily the same as a manufacturer of the diecast controller, and as a result their specifications may be different from each other.

Conventionally, the diecast controller and the sequencer are connected by a plurality of wires between corresponding input/output terminals of the diecast controller and those of the sequencer, as shown in FIG. 5. In this case, since corresponding terminals assigned for signals are connected one by one, a secure connection can be accomplished even when the diecast controller and the sequencer have been manufactured by different manufacturers, provided that signal levels of the diecast controller and of the sequencer are the same.

However, if number of apparatuses and consequently number of terminals increases, number of wires to be connected also increases. Therefore, if a system including a lot of diecast machines is to be constructed, number of wires connecting the diecast controller with the sequencer will be enormous, and as a result, cost of wirings will be rapidly increased and reliability of connections will be decreased due to increase of possibility of miswiring.

In order to solve such a problem, it may be possible to raise workability by preparing an exclusive cable connecting the diecast controller and the sequencer in advance and by connecting both apparatuses with the cable. However, such method needs a lot of preparation time for making cables and there exists still possibility of occurrence of miswiring.

Furthermore, for other case where the number of diecast machines increases, it is usual to provide in the diecast controller a serial communication port based on the RS232C standard which is a standard regulation for the serial communication, and data is serially transmitted from the serial communication port to a serial communication port of the sequencer through an RS232C communication cable.

However, since such data transmission is a serial data transmission having a low data transmission rate, there is a problem in which it can not follow fast real time operations.

SUMMARY OF THE INVENTION

It is a primary object of the present invention to provide a control system for processing machinery which can follow real time operations even in the case where the number of apparatus increases and specifications of a controller and of a sequencer are different from each other.

According to the present invention, there is provided a controller for processing machinery comprising:

at least one sequencer for processing machines to each of which at least one processing machine is connected;

a controller for controlling said sequencer; and bus conversion means for converting signals flowing a bus in the case where a first bus of said sequencer and a second bus of said controller are made on the basis of different specifications.

In this system, even if manufactures of the controller and the sequencer are different, an appropriate signal conversion is performed based on difference of specifications of both buses, and therefore secure connection adapted to real time control can be obtained.

DESCRIPTION OF THE PREFERRED EMBODIMENTS

Preferred embodiments of the present invention will be described with reference to the attached drawings.

Figure 1:
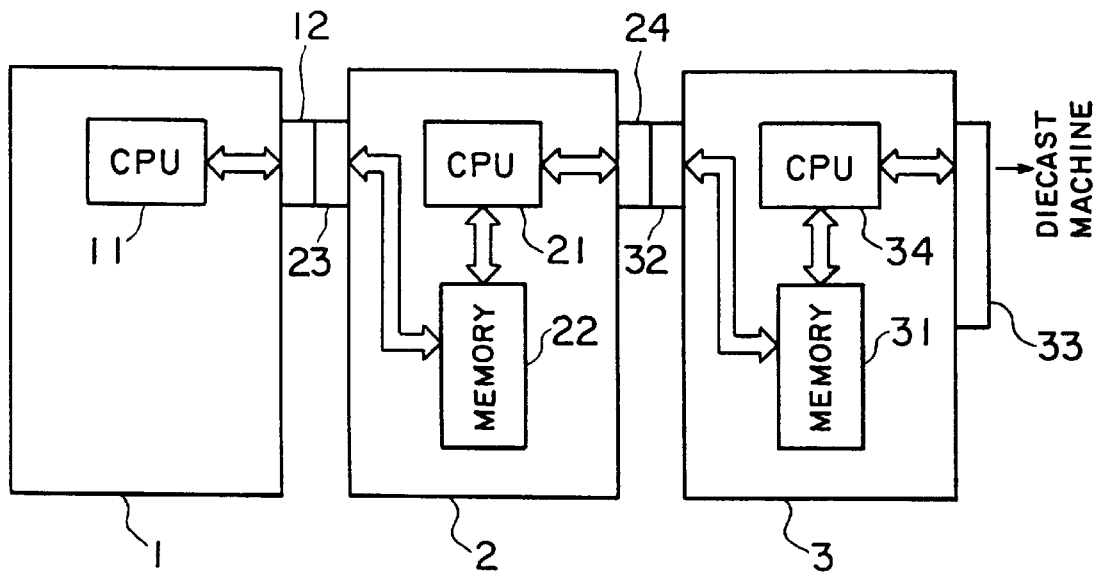
FIG. 1 is a block diagram of an embodiment of a control system for processing machinery according to the present invention.

FIG. 1 shows a block diagram illustrating an embodiment of a control system for processing machinery according to the present invention, in which a bus conversion interface 2 is connected between a diecast controller 1 and a sequencer 3 made by different manufacturer from a manufacture of the diecast controller 1.

The diecast controller 1 includes a microprocessor 11. The microprocessor is, for example, a 68 series 32-bit microprocessor having a clock speed of 12.5 MHz manufactured by MOTOROLA corporation. The diecast controller 1 has a bus connector 12 as an input/output section.

The diecast controller 1 generates various control instructions to the sequencer 3. The diecast controller 1 also changes the contents of control in response to feedback signals from the sequencer 3.

The sequencer 3 is made on the basis of VME bus specification which is one of the standard specifications for control, and is controlled by the diecast controller 1 to operate at least one of diecast machines which are connected to the sequencer 3. For this purpose, the sequencer 3 includes a common memory 31 which stores correspondence between instructions and control codes. Furthermore, for the sequencer 3, a bus connector 32 as an input/output section and input/output terminals (connector) 33 for connecting diecast machines are provided.

A bus is a standardized collective form of a plurality of wires or wiring conductors of a printed wiring board. In the case where the sequencer 3 is manufactured by a different manufacturer from a manufacturer of the diecast controller, bus specifications of both may be different, which results in different connector shapes and different wire allocation.

In order to connect a plurality of buses of different standard, according to the present invention, a bus conversion interface 2 is connected between the diecast controller 1 and the sequencer 3 made by the different manufacturer from the manufacturer of the diecast controller.

As shown in FIG. 1, the bus conversion interface 2 includes a microprocessor 21, a common memory 22 and two connectors, one of which is a bus connector 23 mating the bus connector 12 of the diecast controller and the other of which is a bus connector 24 mating the bus connector 32 of the sequencer 3.

As mentioned above, since the bus is a standardized collective form of a plurality of wires or wiring conductors of a printed wiring board, the following matchings are generally necessary in the conversion between buses of different standard.

First, an overall bus width is necessary to be matched. If the address bus and the data bus are commonly used, the relatively narrow bus width is sufficient. However, if the address bus and the data bus are separately provided, a wide bus width is needed. When bus width of the diecast controller 1 and of the sequencer 3 are different, it is necessary to temporary store address information and data information, when they are established.

Second, data transmission width is necessary to be matched. The wider the data transmission width becomes, the faster data transmission rate becomes. However, widened data transmission width makes cables thicker, which raises cost.

Third, data transmission size is necessary to be matched. This is a problem of selection of 1 word transmission which can be implemented with an easy control or a plurality of word transmission which can be implemented with reduced overhead.

Fourth, bus is controlled synchronously or asynchronously is to be matched.

Furthermore, there is a problem of matching at date receiving between the diecast controller which can generates read/write transactions and a sequencer made by different manufacturer.

The bus conversion interface 2 according to the present invention adjusts all of these matters. In order to manage sequencers made by any manufacturers, a microprocessor provided in the bus conversion interface 2 controls the conversion operations.

Figure 2:
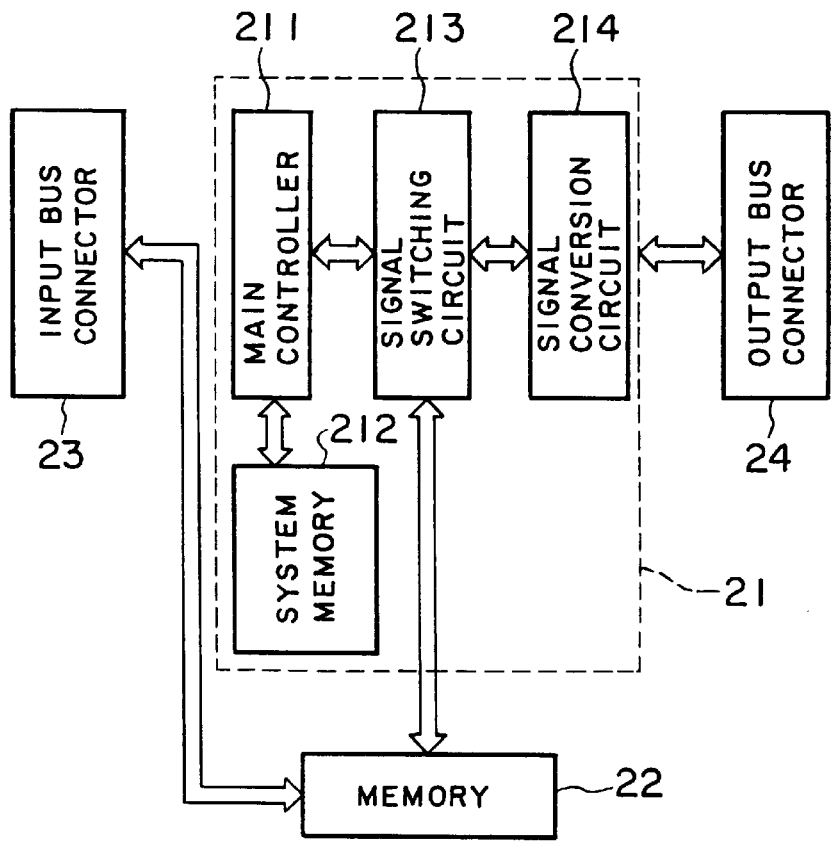
FIG 2 is a block diagram showing detailed construction of a bus interface conversion section.

FIG. 2 is a block diagram showing detailed construction of functional portions of the bus conversion interface.

Referring to FIG. 2, a common memory 22 is connected to an input bus connector 23 through a bus, and a CPU 21 is connected to the common memory 22 through the bus. The CPU 21 has various functions, and functions related to the present invention are expressed by functional blocks as shown in FIG. 2. The CPU 21 has a system memory 212 storing various programs, a main controller 211 which executes conversion operation according to the program stored in the system memory 212, and a signal switching circuit 213 which switches data exchange with the common memory 22 or data exchange with a signal conversion circuit 214 under the control of the main controller 211. The signal conversion circuit 214 executes necessary conversion on signals from the diecast controller 1. An output bus connector 24 which supplies converted signal to the sequencer 3 is provided to the signal conversion circuit 214. The main controller 211 is, for example, a 68 series 16-bit microprocessor having a clock speed of 16 MHz manufactured by MOTOROLA corporation.

Figure 3:
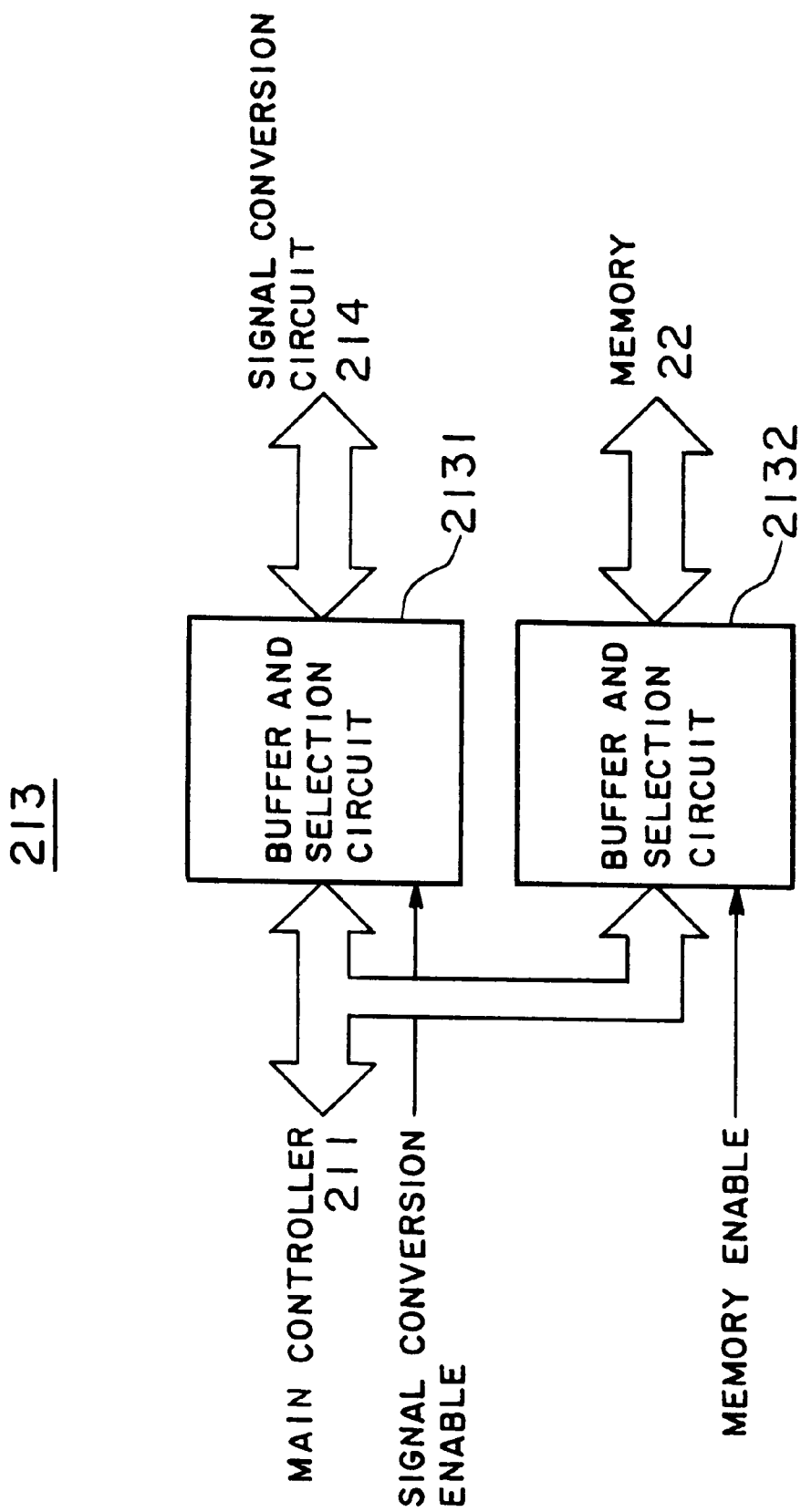
FIG. 3 is a block diagram showing detailed construction of a signal switching circuit.

FIG. 3 is a block diagram showing detailed construction of the signal switching circuit 213. This circuit has a first buffer and selection circuit 2131, a second buffer and selection circuit 2132 and these are connected to the main controller 211 with buses. The first buffer and selection circuit 2131 are bus-connected with the signal conversion circuit 214 and supplied with a signal conversion enable signal. The second buffer and selection circuit 24 are bus-connected with the memory 22 and supplied with a memory enable signal.

The address bus and the data bus of the signal conversion circuit 214 are made based on the VME bus specification. Among the control signals, if a signal generated by the diecast controller 1 and a signal to be received by the sequencer 3 are the same, the signal conversion circuit 214 outputs the signal generated by the diecast controller as it is, and if signals to be received by the sequencer 3 are not exist, the signal conversion circuit 214 generates them by changing timings, levels, durations of other signals and outputs on the VME bus.

Figure 4:
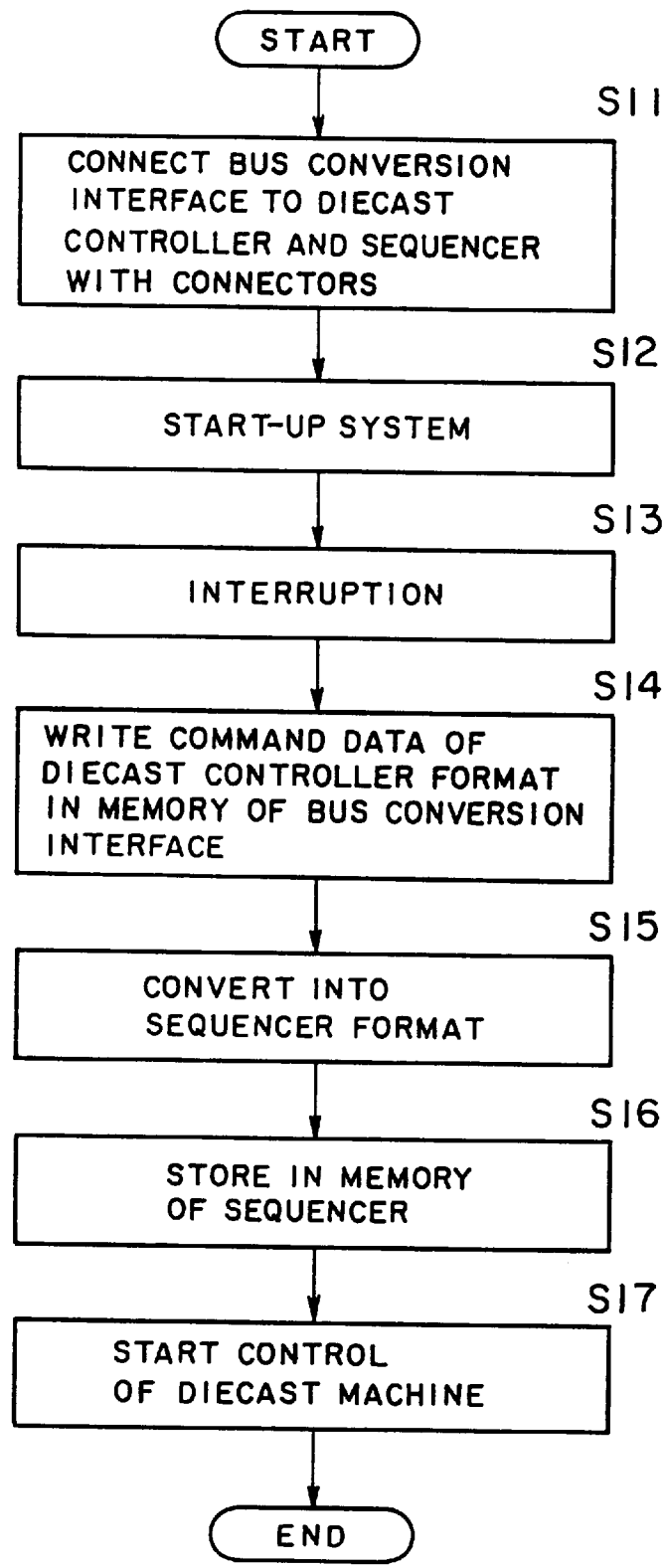
FIG. 4 is a flowchart showing operation of the controler for processing machinery according to the present invention.
Figure 5:
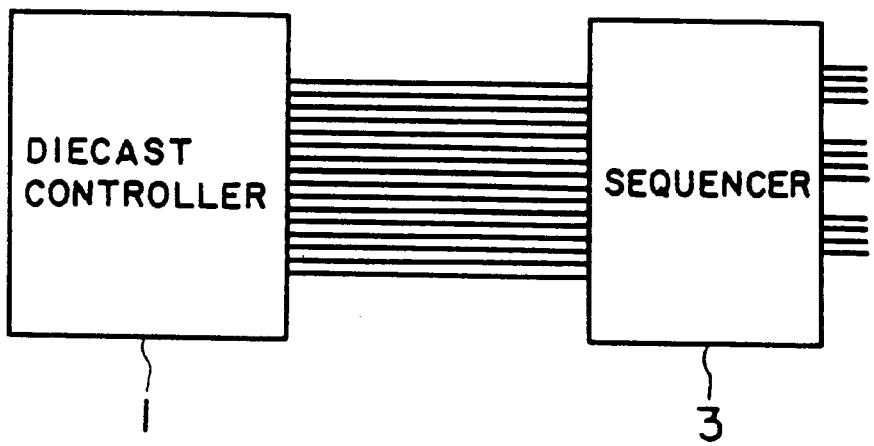
FIG. 5 is a block diagram showing a connection between the diecast controller and the sequencer with a plurality of single wires according to the prior art.
Figure 6:
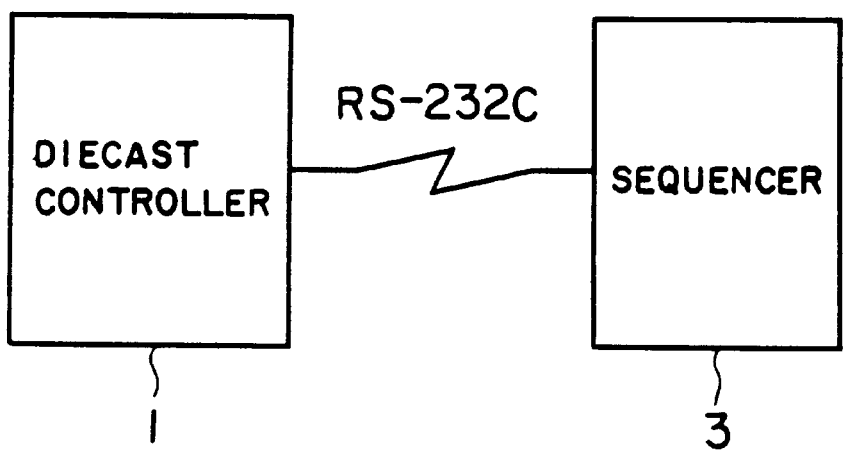
FIG. 6 is a block diagram showing a connection between the diecast controller and the sequencer with an RS-232C serial cable according to the prior art.

An operation of the controller according to one embodiment of the present invention is hereinafter explained with reference to a flowchart of FIG. 4.

In this embodiment, it is assumed that the bus conversion interface is manufactured by a manufacturer of the diecast controller and that the sequencer is manufactured by a different manufacturer.

First, the input/output connector 12 of the diecast controller 1 is connected to the bus connector 23 of the bus conversion interface, and the input/output connector 24 is connected to the input/output connector of the sequencer (step 11). These connectors are provided according to known specifications.

If the system is start-up (step 12), the CPU 11 executes interruption operation (step 13) and writes sequence commands and data having the diecast controller format which are to be executed in the memory 22 of the bus conversion interface 2 (step 14). At this time, in the memory 22, necessary data which are necessary for the diecast controller 1 to control sequence operation without discriminating sequencers. That is, the diecast controller 1 can write necessary data in the memory 22 by assuming that the necessary operation is only one even if the sequencer has been made by any manufacturer. The memory is composed of areas which adopts usual input/output expression such as XYR.

The bus conversion interface 2 switches the signal switching circuit 213 to the memory 22 side for each scan time in order to fetch the stored commands and data to the main controller 211. Thus, by employing the common memory, the sequence commands can be transferred without affected by bus width, data transmission rate, data transmission size, etc.

The main controller 211 interprets the fetched commands and data according to a program stored in the system memory 212, and make the signal conversion circuit 214 to convert the format of the command and data into other format for the sequencer made by different manufacturer (step 15). That is, if conversion is necessary, the main controller 211 generates a signal conversion enable signal to the buffer and selection circuit 2131 to send the commands and data to the signal conversion circuit 214.

The signal conversion circuit 214, as described above, outputs the signal generated by the diecast controller as it is if the signal supplied by the diecast controller and the signal to be received by the sequencer 3 are the same, and if signals to be received by the sequencer 3 are not exist, the signal conversion circuit 214 generates them by changing timings, levels, durations of other signals and outputs on the VME bus.

Furthermore, the conversion results are written into the memory 31 of the sequencer 3 via the signal switching circuit 213 and the signal conversion circuit 214 (step 16).

Here, the memory 31 stores commands in the form of sequencer start-up command according to an exclusive VME bus specification of a manufacture.

Status information of the sequencer side is stored in the memory 31 of the sequencer, and this status information is read out in case of need and is utilized as an important information.

For example, when it is assumed that the diecast controller 1 has an inherent special bus configuration and the sequencer has a standardized bus configuration such as VME bus, the bus conversion interface can in advance define a signal switching circuit and a signal conversion circuit which suit for the sue of VME bus according to command and data construction information stored in the memory 22.

Accordingly, the bus conversion interface 21 mediates between data stored in the memory 22 and data stored in the memory 31.

The sequencer 3 controls apparatuses to be controlled such as diecast machine using the converted commands and data thus obtained (step 17).

As described above, according to the present invention, a diecast controller can control sequencers made by different manufacturers in real time. Furthermore, since connection between the diecast controller and the sequencer is perfectly and easily accomplished by connecting buses thereof, it is not necessary to connect both input/output terminals by wires or an exclusive cable and therefore reduces miswirings. Moreover, since the bus conversion interface can be made in relatively small size, there will be no difficulty in connection.

The system of bus conversion can be modified to adapt it to the system of the diecast controller. For example, if the sequencer is controlled by the diecast controller, the conversion interface may preferably be constructed by pure hardware.

Furthermore, in order that the bus conversion interface can cope with any type of sequencers manufactured by any manufacturer, it is preferable for the bus conversion interface to have a microprocessor for increasing freedom of conversion.

In the above-mentioned embodiment, though the connections between the diecast controller and the bus conversion interface and between the bus conversion interface and the sequencer are performed by direct connections by use of connectors, connections using cables may be employed. Furthermore, since the bus conversion interface is composed of electronic circuits, it will be possible to be included in a case of the diecast controller if it is sufficiently down-sized.

Furthermore, in the above-mentioned embodiment, though diecast machines are described as examples, the present invention is applicable to any processing machines.

According to the present invention, since the control system has a bus conversion circuit between a controller and a sequencer controlled by the controller and connected to processing machinery to be controlled, even in the case where the bus of the controller and the bus of the sequencer are based on different bus specifications, necessary bus conversion makes secure connection which can deal real time operation due to high transmission rate.

What is claimed is:

1. A control system for processing machinery, the control system comprising:

a sequencer connected to at least one processing machine, said sequencer including a first bus having a first bus specification defining a first bus width, a first data transmission width, a first transmission unit size, a first synchronous mode, a first signal level and a first transmission timing;

a controller for controlling said sequencer, said controller including a second bus having a second bus specification defining a second bus width, a second data transmission width, a second transmission unit size, a second synchronous mode, a second signal level and a second transmission timing; and bus conversion means for converting signals corresponding to said second bus into signals corresponding to said first bus when a difference exists between said first bus specification and said second bus specification, said bus conversion means including a signal conversion means for receiving signals on the second bus, adjusting timing and levels of the received signals, and outputting the adjusted signals to the first bus.

2. The control system of claim 1, wherein said bus conversion means further comprises a main control section which controls receiving the signals on the first bus of the controller and signal conversion by the signal conversion means.

3. The control system of claim 2, wherein said bus conversion means further comprises a common memory and a signal switching means for controlling, in response to instructions from the main control section, taking out stored commands and data from the common memory and transmission of the commands and data taken out to the signal conversion means.

4. The control system of claim 3, wherein said signal switching means comprises a first selection circuit which permits transmission of contents stored in the common memory to the main controller in response to a memory enable signal generated by said main controller and a second selection circuit which permits transmission of transmitted contents to the signal conversion means in response to a signal conversion enable signal generated by the main controller.

5. A control system for processing machinery, the control system comprising:

a bus converter adapted to receive signals corresponding to a first bus having a first bus specification and output the signals to a second bus having a second bus specification different from the first bus specification, said bus converter capable of conforming the outputted signals to the second bus specification by adjusting at least timing and levels of the received signals based on a difference between the first bus specification and the second bus specification.

6. The control system of claim 5, wherein said bus converter receives signals flowing through the first bus from a controller and outputs signals through the second bus to a sequencer.

7. The control system of claim 5, wherein the first bus specification defines a first bus width, a first data transmission width, a first transmission unit size, a first synchronous mode, a first signal level and a first transmission timing; and the second bus specification defines a second bus width, a second data transmission width, a second transmission unit size, a second synchronous mode, a second signal level and a second transmission timing.

8. The control system of claim 5, wherein said bus converter further comprises a main control section that controls receiving the signals on the first bus and signal conversion.

9. The control system of claim 8, wherein said bus converter further comprises a common memory and a signal switch for controlling, in response to instructions from the main control section, retrieval of stored commands and data used to perform conversion of the received signals.

* * * * *